US008262984B1

(12) United States Patent
Levine

(10) Patent No.: US 8,262,984 B1
(45) Date of Patent: Sep. 11, 2012

(54) MIXING, MILLING, AND AERATION APPARATUS FOR DIGESTING METAL ORE WITH BACTERIA

(75) Inventor: Bart Levine, Mountain Lakes, NJ (US)

(73) Assignee: Western American Mining Company, Austin, TX (US)

( * ) Notice: Subject to any disclaimer, the term of this patent is extended or adjusted under 35 U.S.C. 154(b) by 353 days.

(21) Appl. No.: 12/714,538

(22) Filed: Feb. 28, 2010

Related U.S. Application Data

(63) Continuation of application No. 12/030,053, filed on Feb. 12, 2008, now abandoned.

(51) Int. Cl.
*C22B 3/02* (2006.01)

(52) U.S. Cl. .......... 266/168; 266/249; 266/251; 75/583; 241/46.15; 366/241; 366/244; 366/279; 366/281; 366/292; 366/325.4; 366/325.92; 366/330.1

(58) Field of Classification Search .................. 266/168, 266/249, 251; 75/583; 241/46.15; 366/101–103, 366/241, 244, 279, 281, 292, 325.4, 325.92, 366/330.1
See application file for complete search history.

(56) References Cited

U.S. PATENT DOCUMENTS

| 3,674,241 A | 7/1972 | Eirich et al. |
| 3,807,968 A | 4/1974 | Finaly et al. |
| 4,248,616 A | 2/1981 | Seng et al. |
| 4,370,198 A | 1/1983 | Dencs et al. |
| 5,057,284 A | 10/1991 | Emmett, Jr. et al. |
| 5,158,240 A | 10/1992 | Ihara et al. |

OTHER PUBLICATIONS

Fernano Acevedo, The use of reactors in biomining processes, EJB Electronic Journal of Biotechnology, Dec. 15, 2000, 1-11, vol. 3 No. 3, Universidad Católica de Valparaíso, Chile.

*Primary Examiner* — Lois Zheng
(74) *Attorney, Agent, or Firm* — Frank J. Dykas; Dykas & Shaver, LLP

(57) ABSTRACT

Disclosed is a mixing, milling, and aeration apparatus for the digestion of metal ore with bacteria. It includes a tank and a center post therein. At least one mixing blade extends radially from the center post. At least one roller is supported by a mixing blade, where each roller is configured to roll about the center of the tank while applying a crushing force to solids within the tank. At least one gas distributor, supported by a mixing blade, defines a plurality of holes through which gas is distributed to encourage mixing of the contents of the tank, to encourage distribution of oxygen through the contents, and to discourage fouling of the bottom of the tank and the rollers.

18 Claims, 2 Drawing Sheets

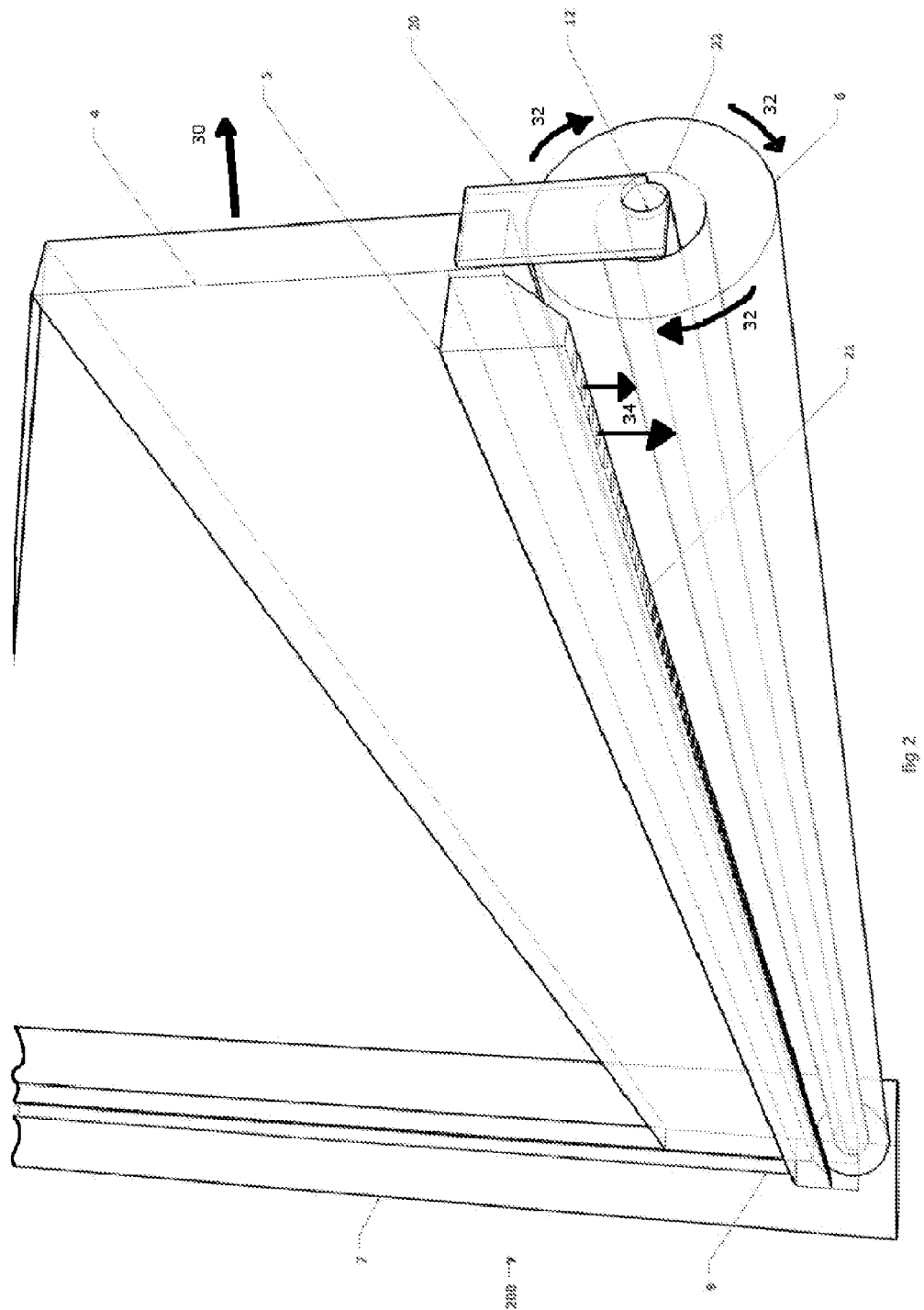

MIXING, MILLING, AND AERATION APPARATUS FOR DIGESTING METAL ORE WITH BACTERIA

PRIORITY/CROSS-REFERENCE TO RELATED APPLICATIONS

This application is a continuation application of application Ser. No. 12/030,053, filed Feb. 12, 2008, now abandoned, entitled MIXING, MILLING, AND AERATION APPARATUS FOR DIGESTING METAL ORE WITH BACTERIA, which is pending and the disclosure of which is incorporated herein by reference.

FIELD OF THE INVENTION

The present invention relates generally to apparatus for implementing biological methods applied to the mining industry and more particularly to apparatus for mixing bioreactors used for mineral oxidation.

BACKGROUND OF THE INVENTION

Biomining makes use of microorganisms in processes aimed at extracting metals from sulfide- and/or iron-containing ores and other mineral concentrates. For example, biomining can be used to recover gold from certain ores. That is, although gold is inert to microbial action, microbes can be used in processes to recover gold from certain ores because the microbes oxidize the ore thereby opening the structure of the ore, which allows gold-solubizing chemicals, such as cyanide, to penetrate the ore.

Biomining is particularly helpful when attempting to retrieve minerals like gold from "refractory" ores. With such refractory ores, conventional fine grinding and cyanidation are not as efficient at retrieving the desired minerals from the ore as biomining. Further, biomining with biooxidation, compared to other oxidation mining techniques, such as roasting and pressure oxidation, is relatively simplistic, requires only mild operating conditions, has low capital costs, requires relatively low amounts of energy, and is friendly toward the environment.

As discussed in Fernando Acevedo's article on "The use of reactors in biomining processes," EJB ELECTRONIC JOURNAL OF BIOTECHNOLOGY, Vol. 3, No. 3, Dec. 15, 2000, available at http://www.ejb.org/content/vol3/issue3/full/4, biooxidation of refractory gold ores with the use of heap operations or tank reactors is well known in the field of biomining. However, each method of biomining has its negatives. For example, though heap operation is simple and adequate to handle large volumes of ores, the productivity and mineral yields are limited because of the inherent difficulty of adequately controlling the process conditions of the heaps. Tank reactors, on the other hand, can handle moderate volumes of ore to be processed, allow for close monitoring and control of process conditions, and render significantly better performance yields than the heap operations. However, the costs for biomining with tank reactors are significantly higher than the costs for biomining with heap operations. The additional cost of the tank reactor methods may be justified only when the ore input to the reactors have a high value of mineral concentrate.

In any regard, during the biooxidation process of gold-containing ore, bacteria, such as those belonging to the *Thiobacillus* or *Leptospirillum* genera, partially oxidize sulfide coatings covering the gold micro particles contained within the ores. These microorganisms are capable of dissolving sulphides, such as pyrite and arsenopyrite, so as to liberate the otherwise-encapsulated gold particles within the ore. Following subsequent processing, such as through cyanidation, gold yields from the ore have been known to reach levels of approximately 85-95%, as opposed to yields of 15-30% when biooxidation is not utilized.

As Fernando Acevedo explains in his article,

[s]everal mass transfer operations occur in a biomining operation. Nutrients have to reach the attached and suspended cells, metabolic products have to migrate from the cells to the liquid and solubilized species must be transported from the surface of the mineral particles to the liquid. In addition, two other important transport processes are to be considered: the supply of oxygen and carbon dioxide from the air to the cells. Carbon dioxide is demanded by the cell population as carbon source, while oxygen is needed as the final electron acceptor of the overall oxidation process. In reactors these gases are usually supplied by bubbling air into the liquid. In order to be used by the cells, oxygen and carbon dioxide must dissolve in the liquid, a mass transfer operation that presents a high resistance and can become limiting for the overall process rate.

Fernando Acevedo, *The Use of Reactors in Biomining Processes*, Vol. 3, No. 3, EJB ELECTRONIC JOURNAL OF BIOTECHNOLOGY, Dec. 15, 2000, available at http://www.ejb.org/content/vol3/issue3/full/4. Accordingly, agitation of the ore to be bio-mined via a bacteria-containing slurry is beneficial to increase transfer rates, including the rates of transfer of oxygen and carbon dioxide as well as heat transfer. Agitation also discourages stagnation of the materials in the bio-reactors and reduces occurrences of unwanted zones of reactor contents with insufficient nutrients, inadequate temperatures, or inadequate pH levels. Ideally, bio-reactors allow for optimal agitation and eliminate stagnant zones within the reactors.

Thus, what is needed is a bio-reactor having agitation features that can economically accommodate biooxidation of significant volumes of mineral-containing ores while producing high levels of mineral yields.

SUMMARY OF THE INVENTION

Embodiments of the present mixing, milling, and aeration apparatus for digesting metal ore with bacteria provide for accelerated reaction times of bio-mining reactor contents with reduced capital investments.

The mixing, milling, and aeration apparatus for digesting metal ore with bacteria combines agitation of bio-reactor contents through mixing with a crushing roller and a gas diffuser so as to encourage agitation of the contents of a bioreactor while providing sufficient gas diffusion therethrough and while discouraging fouling of the interior of the bioreactor.

The mixing, milling, and aeration apparatus for digesting metal ore with bacteria of the present invention includes a bio-reactor tank in the center of which is a central post to which is attached a plurality of mixing blades. The mixing blades are configured to revolve around the center of the tank so as to encourage mixing of the contents of the tank. Each blade is further fitted with a gas distributor, which is attached to the retreating side of the blade. Gas is supplied through the distributor and up and into the tank via a pipe that is attached to each distributor. More particularly, each gas distributor includes a series of holes that are aligned along the bottom edge of the distributor so that a curtain of gas bubbles may be forced into the tank so as to provide oxygen to the contents of the tank and to agitate the contents.

Each blade is further fitted with a roller that is configured to roll along the interior bottom of the tank as the blades revolve around the tank. During revolution, the rollers crush solids that have come to rest on the interior bottom of the tank. This discourages fouling of the interior bottom of the tank.

Ideally, the gas distributors are fitted to the blade in such a way that when gas is forced through the holes in the distributor, the gas comes into contact with the surface of the rollers hanging below the blades so as to, in a sense, blow off solids that have accumulated on the surface of the roller. Thus, fouling of the rollers is discouraged.

The purpose of the foregoing summary is to enable the public, and especially the scientists, engineers, and practitioners in the art who are not familiar with patent or legal terms or phraseology to determine quickly from a cursory inspection the nature and essence of the technical disclosure of the application. The summary is neither intended to define the invention of the application, which is measured by the claims, nor is it intended to be limited as to the scope of the invention in any way.

Still other features and advantages of the present apparatus will become readily apparent to those skilled in this art from the following detailed description describing preferred embodiments of the apparatus, simply by way of illustration of the best mode contemplated by carrying out this apparatus. As will be realized, the apparatus is capable of modifications in various obvious respects all without departing from the invention. Accordingly, the drawings and description of the preferred embodiments are to be regarded as illustrative, and not as restrictive.

BRIEF DESCRIPTION OF THE DRAWINGS

FIG. 2 is an isometric, partial perspective view of the rotor/roller assembly of the mixing, milling, and aeration apparatus for digesting metal ore with bacteria according to the embodiment shown in FIG. 1.

DESCRIPTION OF THE PREFERRED EMBODIMENTS

Figure 1:
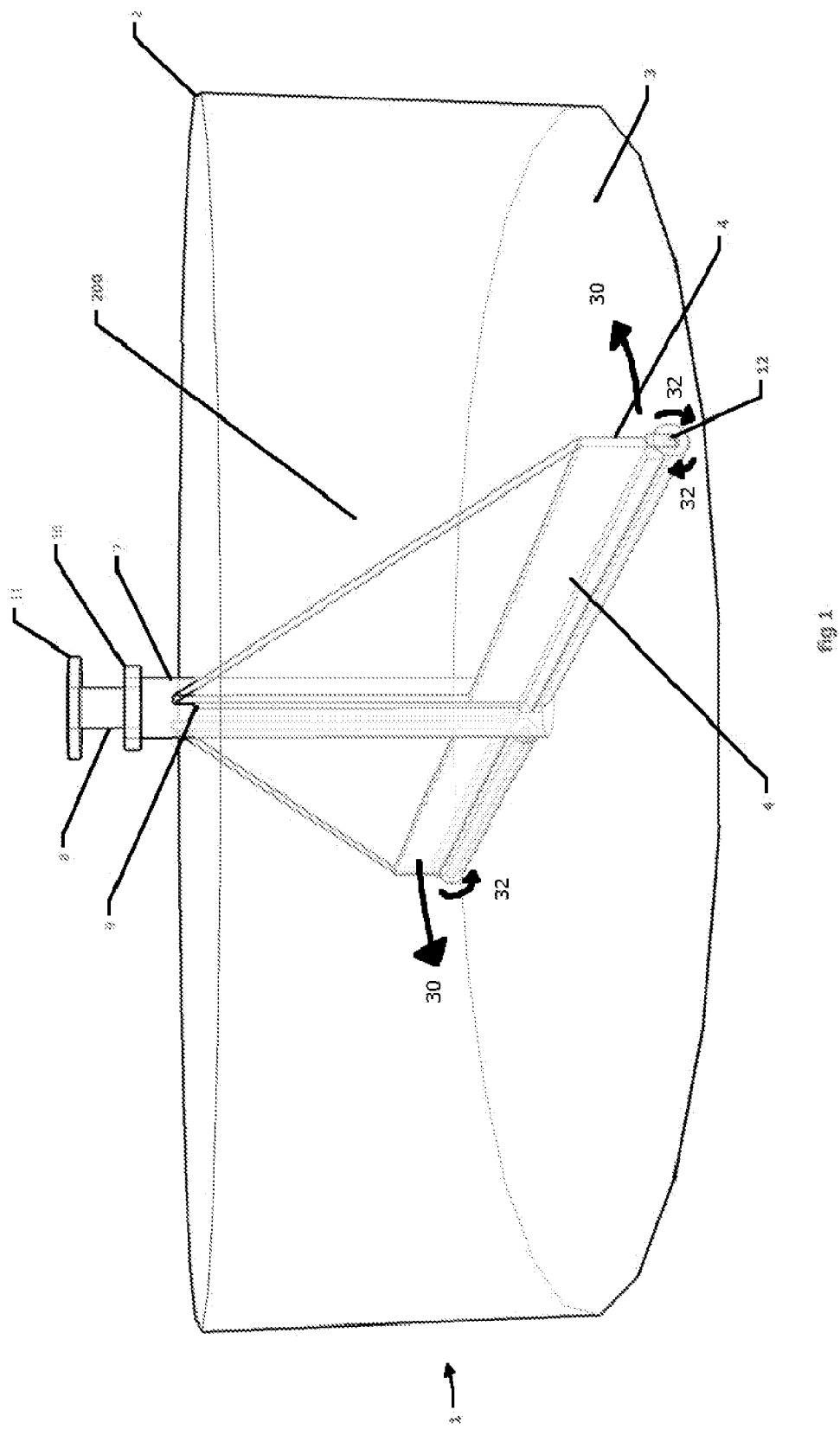
FIG. 1 is an isometric, perspective view of a first embodiment of the mixing, milling, and aeration apparatus for digesting metal ore with bacteria.

While the mixing, milling, and aeration apparatus is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in the figures for purpose of illustration, the mixing, milling, aeration apparatus for digesting metal ore with bacteria is embodied in a biooxidation reactor containing a revolving, mixing paddle assembly within a tank, a gas distributor, a crushing roller, which, when in use, encourages agitation of the bio-reactor contents while discouraging fouling by solids in the tank.

In the following description and in the figures, like elements are identified with like reference numerals. The use of "or" indicates a non-exclusive alternative without limitation unless otherwise noted. The use of "including" means "including, but not limited to," unless otherwise noted.

The preferred embodiment of the mixing, milling, and aeration apparatus for digesting metal ore with bacteria is shown in FIGS. 1 and 2. In particular, the apparatus includes a bioreactor 1 that includes a mixing paddle assembly 200 contained within a tank 2. A center axel post 8 is affixed to the interior bottom surface 3 of the tank 2. The center axel post 8 is configured to support the mixing paddle assembly 200 and to allow the mixing paddle assembly 200 to revolve. More particularly, a bearing 10 is attached to the center axel post 8. A central shaft cylinder 7 hangs from the bearing 10 and at least partially surrounds the exterior of the center axel post 8. The mixing paddle assembly 200 is fixedly attached to the central shaft cylinder 7. The central shaft cylinder 7 is configured to hang from the center axel post 8 so that there is a clearance between the bottom surface of the central shaft cylinder 7 and the interior bottom surface 3 of the tank 2. The central shaft cylinder 7 is further configured to revolve the mixing paddle assembly 200 around the center of the tank 2.

The mixing paddle assembly 200 comprises at least one mixing blade 4, preferably at least a pair of mixing blades 4, that are attached to and radiate from the central shaft cylinder 7 such that the pair of mixing blades essentially lay along the diameter of the tank 2 so that each mixing blade 4 aligns with the other of the pair. Of course, the diameter of the tank 2 is defined as being twice the tank radius. Each mixing blade 4 defines a mixing blade length, and the mixing blade length of each mixing blade 4 is configured so that there is a clearance between the free end of each and the interior wall the tank 2. It is preferred that the mixing blades 4 are further configured to be of such a mixing blade length that the revolution of the blades 4 in the tank 2 discourages fouling of the tank 2 by nondisolved solids. It is further preferred that each blade 4 is of a height chosen with a mind toward the mixing dynamics of the contents of the bio-reactor, including fluid viscosity and power input. According to the preferred embodiment, each blade 4 is twelve inches in height.

As shown in FIG. 2, supported by each blade 4 is a roller 6 that has a central bore 22. Each roller radially extends from the center axel post 8. More specifically, below each blade 4 is a shaft 12 that is affixed to the exterior circumference of the central shaft cylinder 7. The shaft 12 extends axially from the central shaft cylinder 7 through the central bore 22 of a roller 6. As such, each shaft 12 is essentially parallel to the blade 4 above. Supported by the free end of each blade 4 is a hanger 20 to which the free end of one shaft 12 is attached. Thus, each roller 6 is discouraged from extensive horizontal sliding due to its interference with the exterior circumference of the central shaft cylinder 7 on one end and the hanger 20 on the other end. In addition, the central bore 22 of each roller 6 is configured to allow each roller 6 to move to some degree vertically when the roller comes into contact with solid ore deposits resting on the interior bottom surface 3 of the tank 2 as the roller 6 revolves around the tank 2. Specifically, each roller is configured to roll in a forward roll direction, as indicated by arrow 32, as the mixing blades 4 revolve around the center of the tank 2, as indicated by arrow 30. Each roller is further configured to apply a crushing pressure to the interior bottom surface 3 of the tank 2 so as to crush solids that may otherwise foul the interior bottom surface 3 of the tank 2. In the preferred embodiment, each roller 6 has a four-inch diameter.

Attached along one side of each of the blades 4 is a gas distributor 5. Each gas distributor 5 has a distributor top and a distributor bottom. According to the depicted embodiment, the gas distributor 5 comprises a gas distributor wedge wherein the width of the gas distributor 5 tapers, at least partially, along part of its width from the distributor top to the distributor bottom, such that the distributor bottom's width is less than the distributor top's width. This accommodates the close arrangement of the gas distributor 5 by a roller 6.

It is preferred that the gas distributor 5 be attached along a portion of each blade along the entire bottom edge of each blade 4. Thus, as shown in FIGS. 1 and 2, the blades 4 of the depicted embodiment are configured for revolving in a counterclockwise fashion from a top perspective, as indicated by arrows 30. It is further preferred that each gas distributor 5 be attached along the retreating side of each blade 4, the retreating side being the side of the blade that faces away from the direction in which the blade revolves around the tank 2. The advancing side of each blade 4 is the side of the blade 4 that faces toward the direction in which the blade revolves around the tank 2.

Each gas distributor 5 defines a plurality of holes 21, preferably aligned in a linear array of uniformly-spaced alignment along the distributor bottom of the gas distributor 5. The plurality of holes 21 is configured to allow passage of gas therethrough and into the tank 2. A pipe 9 is attached to each gas distributor 5 at the end of the distributor nearest the center of the tank 2. The pipe 9 is configured to accommodate supply of gas from a surface gas supply source (not shown) through the pipe 9, into the gas distributor 5, through the linear array of a plurality of holes 21, and up through the contents of the tank 2. It is preferred that the linear array of a plurality of holes 21 be further configured so that when gas is supplied therethrough and into the tank 2, a gas curtain of bubbles is discharged between the surface of the liquid within the tank 2 so as to create an upwelling of the liquid contained within the tank 2 and so as to encourage mixing of the material within the tank 2. It is further preferred that the linear array of a plurality of holes 21 be aligned along a lower edge of the gas distributor 5 so that when gas is supplied therethrough, the gas contacts the surface of the roller 6 and forces the removal of solid deposits from the surface of the roller 6 so as to discourage fouling of the surface of the roller 6. In particular, it is preferred that each gas distributor 5 is attached to the retreating side of a mixing blade 4 such that as the roller 6 rolls along the interior bottom surface 3 of the tank 2, the plurality of holes 21 are oppositely directed 34 relative to the roll direction 32. Thus, as gas exits the plurality of holes 21 in the direction indicated by arrow 34, it is directed toward the advancing roller moving in the direction indicated by arrow 32, which further accommodates removal of material from the exterior surface of the roller 6.

It is preferred that the pipe 9 be configured to revolve with respect to the center axel post 8 while remaining static with respect to the connecting gas distributor 5. Accordingly, it is preferred that the pipe 9 is connected to the static surface gas supply source via a swivel connection.

The material chosen to construct the mixing, milling, aeration apparatus for digesting metal ore with bacteria should be a material that will not be corroded by the reactants added to the bio-reactor 1. Notably, some bacteria commonly utilized in biomining reactions thrive at acidic pH levels. Such levels would be incompatible with apparatus comprised of carbon steel, for instance. Accordingly, stainless steel or a similar protective coating is preferred.

To put the foregoing in a clearer context, in a gold biomining operation, the inputs to the mixing, milling, aeration apparatus for digesting metal ore with bacteria would be amounts of refractory gold ore and process water. These would be added to the tank 2 to yield a slurry of approximately 10-15% solid density. Further, the slurry would be fed to the tank 2 at acidic pH levels. Following biooxidation in the bio-reactor 1, the processed slurry would be transferred to a settling tank (not shown), the biomined residue collected, lime treated, and cyanided.

The speed of the revolution of the mixing paddle assembly 200 should be one that minimizes the suspension of solids within the tank 2 so that coarse ore solids settle to the interior bottom surface 3 of the tank 2 so that they can be acted upon by the crushing rollers 6. However, the revolution speed should be fast enough so as to encourage sufficient agitation of the contents of the tank so as to allow for the necessary transfer mechanisms described above.

The exemplary embodiments shown in the figures and described above illustrate, but do not limit, the invention. It should be understood that there is no intention to limit the invention to the specific form disclosed. Rather, the intention is to cover all modifications, alternative constructions, and equivalents falling within the spirit and scope of the invention as defined in the claims. For example, while the exemplary embodiments illustrate the use of a flat-blade impeller in the mixing paddle assembly 200, the design is also applicable to pitched-blades for use in pitched blade turbine agitation. Further, while a mixing paddle assembly 200 comprising a pair of mixing blades 4 is depicted in the figures, the invention may also incorporate additional blades such as a third or fourth impeller blade. Additionally, the gas distributor may be relocated.

While the apparatus is not limited to use with gold ore, it is expected that various embodiments of the invention will be particularly useful in other mixing activities. Hence, the foregoing description should not be construed to limit the scope of the invention, which is defined in the following claims. Accordingly, while there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A mixing, milling, and aeration apparatus for digesting metal ore with bacteria comprising:
    a tank configured to contain contents, said contents including solids and bacteria, said tank having a center, an interior bottom surface, and an interior wall, said interior bottom surface defining a tank radius length;
    a center post supported by said interior bottom surface of said tank in an area proximate to said center;
    a plurality of mixing blades, each blade having a bottom blade edge, a fixed end, and a free end, each of said mixing blades defining a blade length, each of said fixed ends being attached to said center post, each of said mixing blades radially extending from said center post, said plurality of mixing blades being configured to revolve around said center and to mix said contents within said tank;
    at least one roller, each of said rollers defining a roller length essentially equal to said blade length, each of said rollers also defining a central bore aligned along a central roller axis, each of said rollers being supported by one of said mixing blades and being arranged to radially extend from said center post, each of said rollers being configured to roll in a forward roll direction about its respective central roller axis as said roller rolls along said interior bottom surface and as said plurality of mixing blades revolve around said center, each of said rollers being further configured to apply a crushing force to said solids while said solids rest along said interior bottom surface; and at least one gas distributor supported by at least one of said mixing blades, each of said gas distributors defining a distributor length essentially equal to said roller length, each of said gas distributors having a distributor top and a distributor bottom, said distributor bottom defining a plurality of holes, each of said gas distributors being arranged such that said plurality of holes are directed toward one of said rollers, said plurality of holes being configured to accommodate distribution of gas through said gas distributor into said contents of said tank;

wherein said plurality of mixing blades revolves in a direction round said center and thereby mixes said contents while, simultaneously, gas is distributed via said at least one gas distributor so as to encourage mixing of said contents and distribution of oxygen through said contents and while, simultaneously, said at least one roller applies said crushing force to said solids on said interior bottom surface of said tank so as to discourage fouling of said interior bottom surface.

2. The mixing, milling, and aeration apparatus of claim 1, wherein each of said mixing blades has an advancing side and a retreating side; and each of said gas distributors is attached to said retreating side of one of said mixing blades such that, as said at least one roller rolls along said interior bottom surface of said tank, said plurality of holes are oppositely directed relative to said roll direction.

3. The mixing, milling, and aeration apparatus of claim 1, wherein said plurality of holes are further configured to accommodate bringing said gas into contact with an exterior surface of one of said rollers; whereby when gas is distributed through said plurality of holes, material that has accumulated along said exterior surface of said rollers will leave said exterior surface so as to discourage fouling of said rollers.

4. The mixing, milling, and aeration apparatus of claim 1, wherein said plurality of holes are arranged in a uniformly-spaced alignment along said distributor bottom.

5. The mixing, milling, and aeration apparatus of claim 1, wherein each of said gas distributors is attached to one of said mixing blades in an area proximate to said bottom blade edge.

6. The mixing, milling, and aeration apparatus of claim 1, wherein each of said gas distributors tapers along part of its width to said distributor bottom, such that said distributor bottom's width is less than said distributor top's width.

7. A mixing, milling, and aeration apparatus for digesting metal ore with bacteria comprising:

a tank configured to contain contents, said contents including solids and bacteria, said tank having a center, an interior bottom surface, and an interior wall, said interior bottom surface defining a tank radius length;

a center post supported by said interior bottom surface of said tank in an area proximate to said center;

a pair of mixing blades, each blade having a bottom blade edge, a fixed end, and a free end, each of said mixing blades defining a blade length, each of said fixed ends being attached to said center post and arranged such that both of said mixing blades align with one another, each of said mixing blades radially extending from said center post, said pair of mixing blades being configured to revolve around said center and to mix said contents within said tank;

a pair of rollers, each of said rollers defining a roller length essentially equal to said blade length, each of said rollers also defining a central bore aligned along a central roller axis, each of said rollers being supported by one of said mixing blades and being arranged to radially extend from said center post, each of said rollers being configured to roll in a forward roll direction about its respective central roller axis as said roller rolls along said interior bottom surface and as said pair of mixing blades revolve around said center, each of said rollers being further configured to apply a crushing force to said solids while said solids rest along said interior bottom surface; and a pair of gas distributors, each of said gas distributors being supported by at least one of said mixing blades, each of said gas distributors defining a distributor length essentially equal to said roller length, each of said gas distributors having a distributor top and a distributor bottom, said distributor bottom defining a plurality of holes, each of said gas distributors being arranged such that said plurality of holes are directed toward one of said rollers, said plurality of holes being configured to accommodate distribution of gas through said gas distributor into said contents of said tank; wherein said pair of mixing blades revolves in a direction round said center and thereby mixes said contents while, simultaneously, gas is distributed via said pair of gas distributors so as to encourage mixing of said contents and distribution of oxygen through said contents and while, simultaneously, said pair of rollers apply said crushing force to said solids on said interior bottom surface of said tank so as to discourage fouling of said interior bottom surface.

8. The mixing, milling, and aeration apparatus of claim 7, wherein each of said mixing blades has an advancing side and a retreating side; and each of said gas distributors is attached to said retreating side of one of said mixing blades such that, as said pair of rollers roll along said interior bottom surface of said tank, said plurality of holes are oppositely directed relative to said roll direction.

9. The mixing, milling, and aeration apparatus of claim 7, wherein said plurality of holes are further configured to accommodate bringing said gas into contact with an exterior surface of one of said rollers; whereby when gas is distributed through said plurality of holes, material that has accumulated along said exterior surface of said rollers will leave said exterior surface so as to discourage fouling of said rollers.

10. The mixing, milling, and aeration apparatus of claim 7, wherein said plurality of holes are arranged in a uniformly-spaced alignment along said distributor bottom.

11. The mixing, milling, and aeration apparatus of claim 7, wherein each of said gas distributors is attached to one of said mixing blades in an area proximate to said bottom blade edge.

12. The mixing, milling, and aeration apparatus of claim 7, wherein each of said gas distributors tapers along part of its width to said distributor bottom, such that said distributor bottom's width is less than said distributor top's width.

13. A mixing, milling, and aeration apparatus for digesting metal ore with bacteria comprising:

a tank configured to contain a slurry of mineral-containing ore and process liquid at an acidic pH level, said tank having a center, an interior bottom surface, and an interior wall, said interior bottom surface defining a tank radius length;

a center axel post supported by said tank;

a bearing attached to said central axel post;

a central shaft cylinder supported by said bearing, said central shaft cylinder at least partially surrounding said central axel post, said central shaft cylinder being configured so as to accommodate rotation of said central shaft cylinder around said central axel post, said central shaft cylinder being further configured so that said central shaft cylinder hangs from said bearing so that there is a clearing between said interior bottom and said central shaft cylinder;

at least one mixing blade having a bottom blade edge, a fixed end, and a free end, each of said mixing blades defining a blade length, said fixed end of each of said mixing blades being attached to said center shaft cylinder, each of said mixing blades radially extending from said center shaft cylinder, each of said mixing blades being configured to revolve around said center and to mix said slurry within said tank;

at least one shaft supported by said central shaft cylinder and extending radially from said central shaft cylinder and being essentially parallel to one of said mixing blades;

at least one roller, each of said rollers defining a roller length essentially equal to said blade length, each of said rollers also defining a central bore aligned along a central roller axis, each of said rollers being supported by one of said mixing blades and being arranged to radially extend from said central shaft cylinder such that each of shafts extends through said central bore of each of said rollers, each of said rollers being configured to roll in a forward roll direction about its respective central roller axis as said roller rolls along said interior bottom surface and as said plurality of mixing blades revolve around said center, each of said rollers being further configured to apply a crushing force to said mineral-containing ore while said mineral containing ore rests along said interior bottom surface, each of said central bores being configured to accommodate vertical movement of said roller with respect to said shaft; and at least one gas distributor supported by at least one of said mixing blades, each of said gas distributors defining a distributor length essentially equal to said roller length, each of said gas distributors having a distributor top and a distributor bottom, said distributor bottom defining a plurality of holes, each of said gas distributors being arranged such that said plurality of holes are directed toward one of said rollers, said plurality of holes being configured to accommodate distribution of gas through said gas distributor into said slurry within said tank;

wherein said at least one mixing blade revolves in a direction round said center and thereby mixes said contents while, simultaneously, gas is distributed via said at least one gas distributor so as to encourage mixing of said slurry and distribution of oxygen through said slurry and while, simultaneously, said at least one roller applies said crushing force to said mineral-containing ore on said interior bottom surface of said tank so as to discourage fouling of said interior bottom surface.

14. The mixing, milling, and aeration apparatus of claim 13, wherein
each of said mixing blades has an advancing side and a retreating side; and
each of said gas distributors is attached to said retreating side of one of said mixing blades such that, as said at least one roller rolls along said interior bottom surface of said tank, said plurality of holes are oppositely directed relative to said roll direction.

15. The mixing, milling, and aeration apparatus of claim 13, wherein said plurality of holes are further configured to accommodate bringing said gas into contact with an exterior surface of one of said rollers; whereby when gas is distributed through said plurality of holes, material that has accumulated along said exterior surface of said rollers will leave said exterior surface so as to discourage fouling of said rollers.

16. The mixing, milling, and aeration apparatus of claim 13, wherein said plurality of holes are arranged in a uniformly-spaced alignment along said distributor bottom.

17. The mixing, milling, and aeration apparatus of claim 13, wherein each of said gas distributors is attached to one of said mixing blades in an area proximate to said bottom blade edge.

18. The mixing, milling, and aeration apparatus of claim 13, wherein each of said gas distributors tapers along part of its width to said distributor bottom, such that said distributor bottom's width is less than said distributor top's width.

* * * * *